United States Patent [19]

Bethmann et al.

[11] 4,034,391
[45] July 5, 1977

[54] EXPOSURE CONTROL APPARATUS HAVING TWO EXPOSURE TIME SETTING POSITIONS

[75] Inventors: Heinz G. Bethmann, Fellbach; Heinz Kilguss, Kornwesthein; Horst Simon, Fellbach, all of Germany

[73] Assignee: Eastman Kodak Company, Rochester, N.Y.

[22] Filed: Feb. 6, 1976

[21] Appl. No.: 655,926

[30] Foreign Application Priority Data

Feb. 21, 1975 Germany .......................... 2507432

[52] U.S. Cl. ................................. 354/289; 354/48
[51] Int. Cl.² ........................................... G03B 7/00
[58] Field of Search .......... 354/266, 267, 268, 289, 354/212, 60 R, 48, 196

[56] References Cited

UNITED STATES PATENTS

| 3,648,581 | 3/1972 | Umemura | 354/289 X |
|---|---|---|---|
| 3,742,824 | 7/1973 | Ueda et al. | 354/289 |

FOREIGN PATENTS OR APPLICATIONS 29,728    1972    Japan .............................. 354/289

*Primary Examiner*—Edna M. O'Connor
*Attorney, Agent, or Firm*—T. H. Close

[57] ABSTRACT

An improved exposure control apparatus for use in a camera having a shutter mechanism utilizing a setting member with first and second positions corresponding to first and second exposure time setting positions of the shutter mechanism. A spring linkage is provided to urge the setting member towards its first position. The spring linkage, upon manual movement of the setting member to its second position, cooperates with structure within the camera to releasably retain the setting member in its second position. A release member, actuated by the preparation of the camera for the next exposure, releases the spring linkage simultaneously with increasing the restoring force exerted on the setting member by the sprink linkage.

6 Claims, 4 Drawing Figures

EXPOSURE CONTROL APPARATUS HAVING TWO EXPOSURE TIME SETTING POSITIONS

BACKGROUND OF THE INVENTION

1. Field of the Invention

This invention relates to a camera having an improved exposure control apparatus utilizing a setting member to select a long or a short exposure time setting position of a shutter mechanism, and, more particularly to such an apparatus where the long exposure time setting is automatically changed to the short exposure time setting after an exposure.

2. Description of the Prior Art

It is known to automatically move an objective lens of a camera from a manually set position to a normal or snapshot setting following an exposure. For example, in U.S. Pat. No. 3,138,082 to Schrumpf, an objective lens is placed in a setting ring coupled with a range setting device. The ring is provided with detent grooves along its periphery corresponding to various range settings. A stop lever cooperates with the detents to hold the lens in a manually set position against the bias of a spring tensioned by rotation of the setting ring. The stop lever is displaced from engagement with the detents after an exposure by a film feed device or a shutter release device thereby allowing the lens to return to the snapshot setting.

It is also known to provide an exposure control apparatus with a switching device to allow an operator to select a normal exposure time setting or a second time setting of a longer duration. See for example, U.S. Pat. No. 3,691,923 issued to Kitai. A problem is sometimes encountered with these devices when one has taken one or several long exposure shots and then forgets to return the switching device to the normal exposure setting since any photographs which are then taken under normal exposure conditions will probably be overexposed. One attempt to eliminate this problem is disclosed in German Patent DT-GBM 1,606,888. When a long time exposure is set, the automatic cocking shutter of the camera is held open by the introduction of a setting lever into the run down path of a shutter blade. When the shutter blade pivots back on termination of the time release action, the setting lever is struck by an abutment edge of the shutter blade and springs into the normal exposure setting. A disadvantage with this device is that the shutter blade is subjected to quite considerable stress and must be designed accordingly. Another disadvantage is that the mechanism cannot be used with more complicated shutters such as diaphragm shutters and focal plane shutters.

SUMMARY OF THE INVENTION

Accordingly, it is an object of the present invention to overcome the disadvantages of the prior art noted hereinbefore and, more specifically, to provide an exposure control apparatus having a shutter mechanism with a setting member for long and short or normal exposure time settings which is of simple and inexpensive construction and does not produce stress on the movable shutter elements.

Another object of the invention is to provide an improved exposure control apparatus having a shutter mechanism with two setting positions and a setting member for automatically changing a second or long exposure time setting to a first short or normal exposure time setting.

In accordance with the present invention, an improved exposure control apparatus is provided having an adjustable shutter mechanism with a first normal or short exposure time setting and a second or long exposure time setting position. The apparatus includes a movable setting member for selecting the first position or the second position of the shutter mechanism, switch contacts electrically connected to an exposure control system and engageable by the setting member when it moves from one position to the other position, latch means for releasably holding the setting member in its second position, spring means for applying a force to the setting member for urging it towards its first position and for urging the latch means into an operative position, and release means for applying a force to the latch means against the force of the spring means for releasing the latch means, the release means also increasing the restoring force of the spring means acting on the setting member.

The invention, and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawing, in which.

DESCRIPTION OF THE PREFERRED EMBODIMENTS

Figure 1:
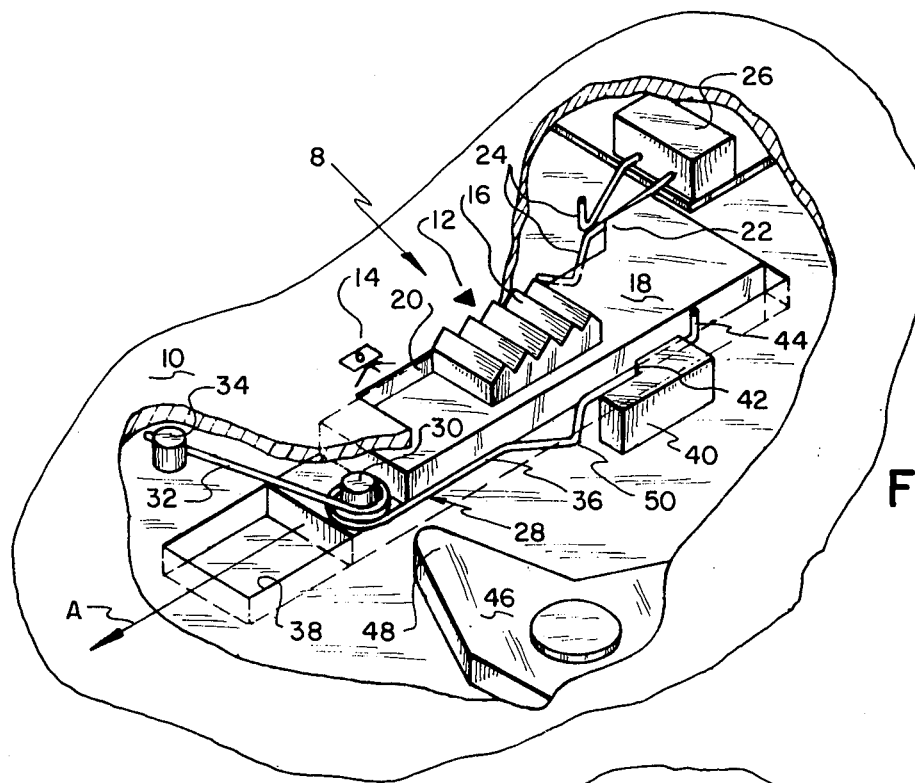
FIG. 1 is a partially cutaway, perspective view of a portion of a camera structure showing one embodiment of an exposure control apparatus incorporating the present invention, illustrating the first exposure time setting.

Because exposure control apparatus and camera shutter mechanisms are well known, the present description will be directed in particular to elements forming part of, or cooperating more directly with, apparatus in accordance with the present invention. It is to be understood that camera elements not specifically shown or described may take various forms well known to those skilled in the art.

Each of the embodiments shown in FIGS. 1–4 includes an exposure control apparatus with a shutter control mechanism, generally designated 8, for use with a camera having a body or housing, a portion of which, designated 10, is shown. The shutter control mechanism 8 has a first position corresponding with an index marking 12 on the camera housing 10 which sets an exposure control mechanism (not shown) for a first or normal exposure interval for example where the length of the exposure interval is determined automatically by an electronic timing circuit (not shown). The shutter control mechanism 8 also has a second position, corresponding with index marking 14 on the camera housing 10, which sets the exposure control mechanism for a second exposure interval of longer duration than the first exposure interval. As shown in each of the embodiments depicted in FIGS. 1-4, a setting member is provided to allow selection of the first or second exposure time setting. Holding or latch means are provided for releasably retaining the setting member in the second position against the return force of spring linkage means when it is desired to take an exposure of longer than normal duration. The holding means is automatically released by movement of a film transport lever or other mechanisms within the camera after the completion of the exposure. Alternatively, the holding means can be manually released.

Figure 2:
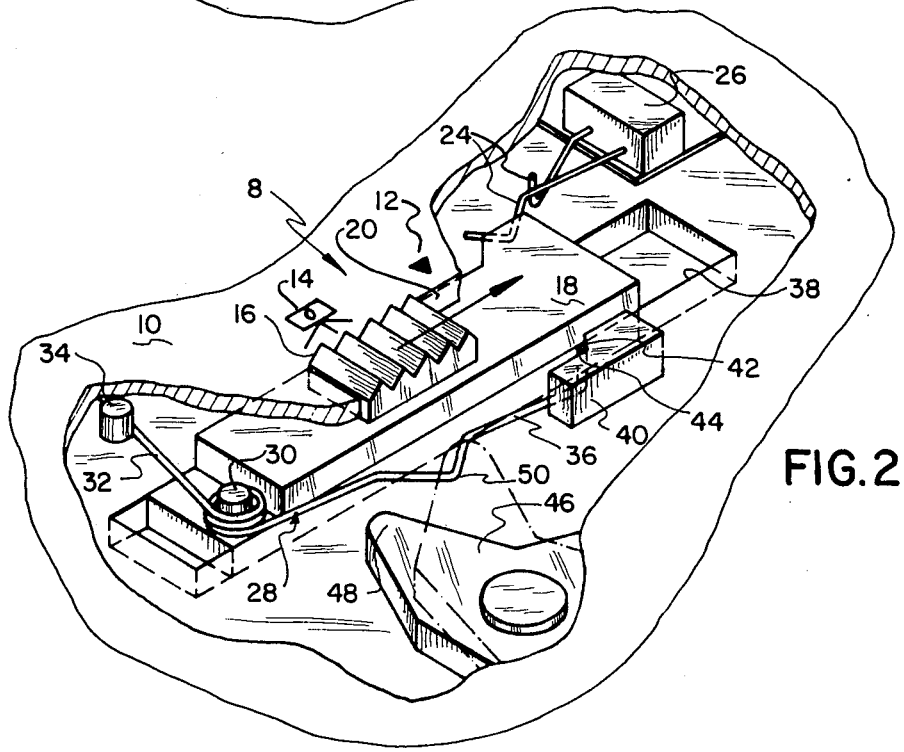
FIG. 2 shows the embodiment of FIG. 1, illustrating the second exposure time setting.

Referring now to FIG. 1, the components of one embodiment of an exposure control apparatus constructed in accordance with the present invention are shown. A serrated portion 16 of a slidable setting member 18, which extends through an opening 20 in the camera housing 10, is brought into alignment with one of the markings 12, 14. A cam portion 22 of the setting member 18 is engageable with the contacts 24 of a switch 26. When the switch 26 is closed, as depicted in FIG. 2, the exposure timing circuit (not shown) is deenergized thereby enabling the operation of a shutter release member (not shown) to determine the length of an exposure time interval. A spring linkage 28 is mounted on a pin 30 on the setting member 18 with its short leg 32 in contact with a stop 34 affixed to the camera housing 10. The long leg 36 of the spring linkage 28 moves with the setting member 18 as the latter moves in a guide portion 38 of the camera housing 10. The long leg 36 is biased outwardly away from slide 18 as shown in FIG. 2. A holding cam 40 is affixed to the camera housing 10 and has an inclined surface 42 designed to retain the free end 44 of the spring linkage 28 when the setting member 18 is aligned with the index marking 14, as shown in FIG. 2. A film advance lever 46 is pivotably mounted in such a manner that, upon actuation, a nose portion 48 engages a V-shaped portion 50 of the spring linkage 28 thereby freeing the end 44 from the holding cam 40 and allowing the setting member 18 to return to a position corresponding with the index marking 12.

The operation of the shutter control mechanism shown in FIGS. 1 and 2 will now be described. When the setting member 18 is in the position shown in FIG. 1 the contacts 24 of the switch 26 are open and the length of an exposure time interval will be determined by a conventional automatic exposure control system. When the setting member 18 is moved from a first position corresponding with index marking 12 to a second position corresponding with index marking 14, as shown in FIG. 2, the contacts 24 of the switch 26 are closed by cam portion 22, thereby deenergizing the electronic timing circuit. As the setting member 18 moves in the direction of arrow A in FIG. 1, the restoring force of the spring linkage 28 is increased by virtue of the engagement between leg 32 and stop 34. The spring linkage 28 would return the setting member 18 to its first position but for the engagement of end 44 of the spring linkage 28 with the inclined surface 42 of the holding cam 40. The setting member 18 is retained in its second position until the nose portion 48 of the film advance lever 46 depresses the V-shaped portion 50 of the spring linkage 28 which disengages end 44 from the inclined surface 42 and allows the spring linkage to return the setting member 18 to its forementioned first position. It will also be seen that the nose portion 48, in addition to releasing the end 44 from the inclined surface 42, increases the restoring force of the spring linkage 28 acting on member 18.

Figure 3:
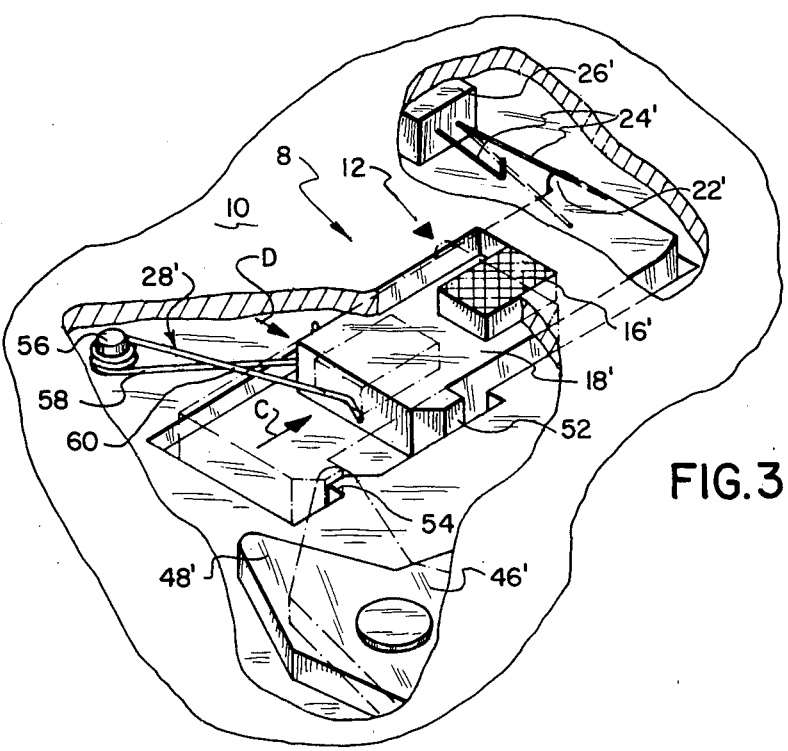
FIG. 3 is a partially cutaway, perspective view of a portion of a camera structure showing a second embodiment of an exposure control apparatus according to the present invention.

Referring to FIG. 3, another embodiment of the present invention is illustrated. The embodiment of FIG. 3 is similar to that of FIGS. 1 and 2 described hereinbefore and, accordingly, the same reference numerals with primes attached have been used to indicate the same or similar parts. A setting member 18' is provided with a portion 16' extending through camera housing 10. Setting member 18' has a first position corresponding with index marking 12 and a second position corresponding with a second index marking (not shown) which corresponds to marking 14 of FIG. 1. When in the first position, a cam portion 22' on the setting member 18' opens the contacts 24' of a switch 26' thereby activating an electronic timing circuit (not shown) in a manner well known to the art. When the setting member 18' is moved to its second position, the contacts 24' of the switch 26' close, thereby deactivating the exposure control system. The setting member 18' has a lug 52 which is forced by spring linkage 28' into engagement with a lug 54 on the camera housing 10 to hold the setting member in its second position. The spring linkage 28', which is mounted on pin 56 to the camera housing 10, has a first leg 58 which exerts a force in the direction shown by arrow D against the setting member 18'. A second leg 60 of the spring linkage 28' pushes against the setting member 18' in the direction of arrow C tending to return the setting member 18' to its first position.

Normally, as set forth above, the setting member 18' is in its first position which provides for an exposure time interval of normal duration. When it is desired to utilize a longer exposure time interval, the setting member 18' is moved in the direction opposite arrow C to its second position, shown in phantom in FIG. 3. In its second position, the lug 52 of the setting member 18' is pushed against lug 54 by leg 58 of spring linkage 28' thereby holding the setting member 18' in its second position. The setting member 18' remains in its second position until the nose portion 48' of the film advance lever 46' presses against the lug 52 releasing it from the lug 54 and allowing the leg 60 of the spring linkage 28' to return the setting member 18' to its first position. It can be seen that when nose portion 48' presses against lug 52, leg 58 of spring linkage 28' is forced in a direction opposite arrow D and the distance between legs 58 and 60 is increased thereby increasing the restoring force of the spring linkage 28'. The increase in restoring force results in an increase in the force exerted on setting member 18' by leg 60.

Figure 4:
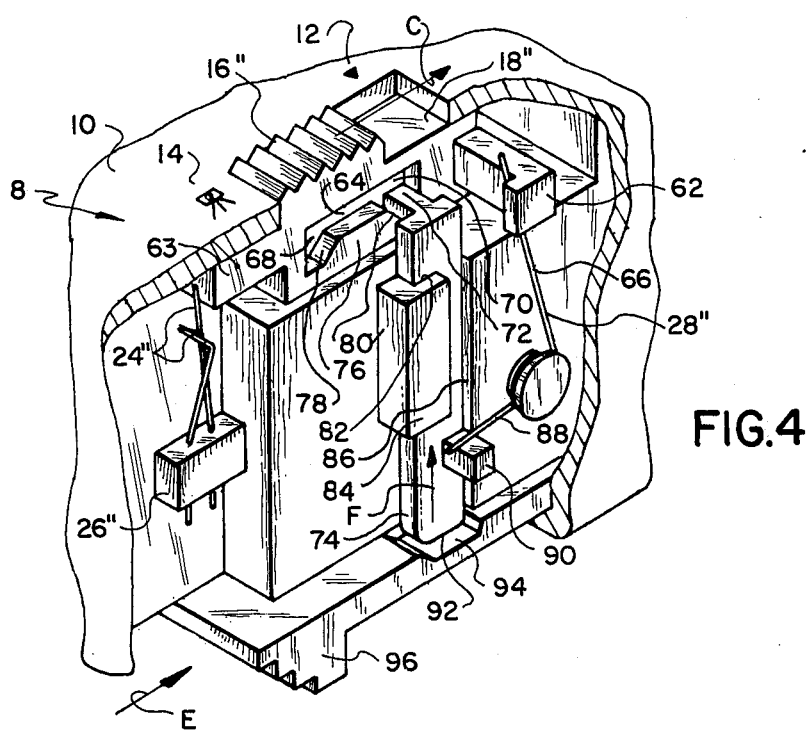
FIG. 4 is a partially cutaway, perspective view of a portion of a camera structure showing a third embodiment of an exposure control apparatus according to the present invention.

Referring now to FIG. 4, another embodiment of the invention may be seen. Since the embodiment illustrated in FIG. 4 is similar to the embodiment shown in FIGS. 1-3 described herein-before, the same reference numerals with double primes have been used to indicate the same or similar parts.

A setting member 18" is slidably mounted in a guide way (not shown) in the camera housing 10 with a serrated portion 16" extending through an opening 20" in the camera housing 10. The setting member 18" is manually movable prior to an exposure between a first position corresponding with index marking 12 to a second position corresponding with index marking 14. The setting member 18", if set in its second position, is automatically moved back to its first position by a mechanism within the camera after an exposure. The setting member 18" has a control arm 62 extending laterally therefrom, a shoulder portion 63, and a cutaway portion or opening 64. The setting member 18" is urged toward its first position by force exerted on arm 62 by a long leg 66 of spring linkage 28". The shoulder portion 63 is designed to close contacts 24" of switch 26" when the setting member 18" is in its second position which deactivates an electronic timing circuit mechanism. The opening 64 has two recess portions, designated 68 and 70 respectively, which, in cooperation with tab 72 laterally extending from a slide 74, releasably retain the setting member 18" in either its first or its second position. A cam surface 76 having shoulder portions 78 and 80 separates the recess 68 from the recess 70. The slope of the shoulder portions 78 and 80 facilitates the movement of the tab 72 between the recess portions 68 and 70. The slider 74 is mounted for movement in a vertical direction, as shown in FIG. 4, in a guide way 82 defined by shoulder portions 84 and 86 of the camera housing 10. The tab 72 of the slider 74 is releasably retained in one of the recess portions 68, 70 by force exerted on an arm 90 laterally extending from the slider 74 by a short arm 88 of the spring linkage 28". An end, designated 92, of the slider 74 extends into a recessed portion 94 of a film transport or cocking lever 96.

In the position illustrated in FIG. 4, the shutter control mechanism is set in its second position with the contacts 24" of switch 26" closed by the shoulder portion 63 of the setting member 18". Tab 72 of the slider 74 extends into recess portion 70 in the setting member 18" holding the setting member 18" in its second position. This is because the force exerted by leg 66 of spring linkage 28" through arm 62 and shoulder portion 80 of setting member 18" on slider 74 is not sufficient to overcome the force exerted on the slider by leg 88 of the spring linkage 28". Movement of lever 96, after an exposure, in the direction of arrow E causes slider 74 to move in the direction of arrow F. Tab 72 rises along shoulder portion 80 thus allowing setting member 18" to move in the direction of arrow C. Return of lever 96 to its initial position, as shown in FIG. 4, allows end 92 to reseat in the recess portion 94 thereby seating tab 72 in recess portion 68 and holding the setting member 18" in its first position. Upward movement of slider 74, in addition to releasing tab 72 from recess portion 70, also causes upward movement of leg 88 of spring linkage 28" thereby increasing tension on spring linkage 28" and increasing the force exerted by leg 66 of spring linkage 28" on arm 62. After setting member 18" reaches its first position, it is releasably retained by the engagement of tab 72 with recess portion 68 and the engagement of end 92 of slider 74 with recessed portion 94 of lever 96.

It will be recognized by those skilled in the art that the length of the first exposure time interval can be established by mechanical means, with the electronic timing circuit determining the length of the second exposure time interval. In such a case, the circuitry connecting the switch contacts to the electronic timing circuit is designed to energize the timing circuit when the setting member is moved into its second position. It will be obvious that the present invention is equally applicable to a camera wherein the length of the first exposure time interval is determined by fixed mechanical means with the length of the second exposure time interval determined by manual actuation and release of a shutter member.

Practice of the present invention is also not limited to exposure control apparatus wherein the first exposure time interval is always shorter than the second. It will be further obvious that to have either the first or second exposure time interval determined by an electronic timing circuit with the other exposure time interval determined by fixed mechanical means or by manual release of a shutter member. In such a system, the length of the second exposure time interval could be less than, the same as, or more than the first exposure time interval, depending on ambient light conditions and the design parameters of the fixed mechanical means.

The invention has been described in detail with particular reference to preferred embodiments thereof, but it will be understood that variations and modifications can be effected within the spirit and scope of the invention.

We claim:

1. In a photographic camera having a camera housing and an adjustable exposure control system, improved means for adjusting the exposure control system comprising:
    a. a setting member movable between a first and a second position for setting the exposure control system;
    b. spring means for applying a force to said setting member to urge it towards its first position;
    c. latch means operatively associated with said spring means for releasably retaining said setting member upon movement of said setting member to its second position; and
    d. release means for simultaneously releasing said latch means and for increasing the force exerted on said setting member by said spring means.

2. In a camera as claimed in claim 1, the improvement wherein said spring means comprises a spring having two arms, said spring being mounted on said setting member, one arm of said spring being engageable by a portion of the camera housing to apply a force to urge said setting member towards its first position and a portion of the other arm being engageable by said latch means, said latch means comprising a second portion of the camera housing.

3. In a camera as claimed in claim 2, further comprising means for advancing film after an exposure, the improvement wherein said release means comprises a portion of said means for advancing film, said portion engaging a portion of said other arm of said spring and releasing said other arm from engagement with said latch means.

4. In a camera as claimed in claim 1, the improvement wherein said spring means comprises a spring having two arms, said spring being mounted on a portion of the camera housing, one arm of said spring applying a force in a first direction to said setting member to urge it towards its first position, the other arm of said spring applying another force to said setting member in a direction generally perpendicular to said first direction, said other force urging a portion of said setting member into latching engagement with said latch means upon movement of said setting member to its second position.

5. In a camera as claimed in claim 1 further comprising means for advancing film after an exposure, the improvement wherein said spring means is mounted on a portion of the camera housing and comprises a spring having two arms, one arm of said spring being engageable with a portion of said setting member to apply a force to urge said setting member to its first position and the other arm being engageable with a portion of said latch means, said latch means comprising:

the portion engaged by said other arm of said spring;

a second portion for retaining the setting member in either its first or its second position, said second portion of said latch means being urged by the engagement of said other arm of said spring with said first portion of said latch means into engagement with a first or second portion of said setting member to retain said setting member in its first or its second position; and a third portion engageable by the means for advancing film for moving said first portion against the force of said other arm thereby releasing the engagement of said second portion of said latch means with said setting member.

6. In a photographic camera having a camera housing and an adjustable exposure control system, means for adjusting the exposure control system comprising:

a. a setting member for setting the exposure control system, movable between a first position and a second position;

b. latch means attached to said setting member and engageable with the camera housing for releasably holding said setting member in said second position;

c. spring means for:
 1. urging said latch means into latching engagement with the camera body, and
 2. applying a restoring force to said setting member to urge said setting member towards said first position;

d. release means, effective when actuated, to apply a force to said latch means against the force of said spring means to:
 1. release said latch means from engagement with the camera body, and
 2. increase the tension on said spring means, thereby increasing the restoring force exerted by said spring means on said setting member.

* * * * *